Patented July 15, 1941

2,249,367

UNITED STATES PATENT OFFICE 2,249,367

PRODUCTION OF SILVER CATALYSTS

Gerardus Hendricus Visser, Amsterdam, Netherlands, assignor to Shell Development Company, San Francisco, Calif., a corporation of Delaware No Drawing. Application July 11, 1938, Serial No. 218,635. In the Netherlands August 11, 1937

10 Claims. (Cl. 252—235)

This invention relates to the manufacture of metal catalysts and refers more particularly to the preparation of extremely active silver metal catalysts applicable to use in a wide variety of chemical processes.

The invention provides a practical and economical process in accordance with which silver metal catalysts are prepared from silver or silver compounds under conditions which render the resulting silver metal more active in a wide variety of chemical reactions than the silver metal catalysts prepared in accordance with the methods and under the conditions in use in the art prior to the present invention.

Silver metal catalysts are at present prepared by several different methods. One commonly used method consists in impregnating an inert spacing material with an aqueous solution of a silver salt, heating the resulting mass under controlled conditions to drive off water and the acid radical with which the metal is combined to produce the oxide of the metal, air being present if necessary to the formation of the oxide, and reducing the oxide at suitable temperatures in the presence of a reducing gas. Another method in use for the preparation of silver metal catalysts consists in thermally decomposing, preferably in a reducing or inert atmosphere, an organic silver compound, for example, a silver salt of a carboxylic acid. Finely divided silver metal catalysts are also prepared, principally for use in liquid phase reactions, by dissolving or suspending decomposable silver compounds in inert liquid media or in liquids intended for subsequent reaction and decomposing the silver compound in situ by the application of heat usually with the passage of hydrogen through the liquid in which the resulting metallic silver is deposited.

Some of the silver catalysts prepared in accordance with the prior art methods under properly controlled temperature conditions have a certain degree of effectiveness in accelerating the normal rate of many chemical reactions, but none of a great number tested have the effectiveness of the silver catalysts of the present invention in accelerating the rate of certain hydrogenation and oxidation reactions. For example, the silver catalysts prepared in accordance with the process of the invention are very effective catalysts for the hydrogenation of unsaturated organic compounds. In their presence, ethylene can be substantially completely hydrogenated to ethane at temperatures as low as 170° C. It is known from the literature that silver metal catalysts prepared by the conventional methods are incapable or only capable to a very limited extent of catalyzing the hydrogenation of ethylene. The silver metal catalysts prepared in accordance with the process of the invention are particularly effective in effecting the oxidation of ethylene to ethylene oxide. Their use permits the attainment of better yields, while operating at lower temperatures and thereby decreasing losses due to side reactions, than can be obtained with silver catalysts prepared by the known methods.

In accordance with the present invention, silver metal catalysts are prepared by subjecting silver and/or silver compounds while in an aqueous medium to the action of nascent hydrogen. The nascent hydrogen may be generated in the liquid medium in which the silver metal catalyst is being prepared. For the attainment of the best results, the nascent hydrogen is preferably used as soon as practicable after its preparation. For this reason, it is desirable, in many cases, to prepare the catalyst in such a manner and under such conditions that, in the same media and at the same time, nascent hydrogen is generated and acts on the silver metal during and after its formation.

A convenient method of executing the process of the invention to obtain a highly active silver metal catalyst comprises reducing a silver compound in an aqueous medium by means of nascent hydrogen generated in said aqueous medium by dissolving therein a metal which is above hydrogen in the electromotive series of the elements. The aqueous medium in which the reduction of the dissolved or suspended inorganic or organic silver compound is effected may be acidic, neutral or alkaline depending upon the particular silver compound to be reduced and upon the particular metal which is to be dissolved therein to furnish the nascent hydrogen for the reduction. The reduction may be effected at any suitable temperature. In many cases, it may be effected at about room temperature. A wide variety of metals may be employed for generating the nascent hydrogen in situ. It is only necessary that the metal selected be less noble than silver so that the aqueous medium in which the reduction is effected be incapable of dissolving silver but be capable of dissolving the added metal to generate the nascent hydrogen at the required rate. The reduction of the silver compound is conveniently effected in an aqueous alkaline medium in which a cheap and readily available metal such as zinc or aluminum is dissolved to generate the nascent hydrogen. These metals are preferably applied in a finely divided form. During the reduction, the reaction mixture is preferably agitated, as by mechanical stirring or other suitable means, to insure even generation of the nascent hydrogen and efficient contact of the hydrogen and the material undergoing reduction. The reduction may, if desired, be effected in a closed vessel under superatmospheric pressure, preferably under a pressure of nascent hydrogen generated in the system or introduced into the system from an outside source.

After the reduction is complete, the precipitated silver is separated from the reaction mixture, washed free of salts and any of the added metal which did not react, and dried. To avoid loss of activity of the catalyst due to contact with the air, these operations are preferably effected in a hydrogen atmosphere.

The catalysts prepared in accordance with the process of the invention may be used per se or in conjunction with one or more other metal or metal compound catalysts. They may, if desired, be supported on suitable catalyst carriers and supports such as charcoal, pumice, alumina, clay, etc. In some cases, the activity of the catalysts may be enhanced by incorporating therewith small amounts of promoter substances. Suitable substances for this purpose are platinum, gold, manganese, etc.

The silver metal and silver metal containing catalysts prepared in accordance with the process of this invention will be found highly advantageous and economical for use in a wide variety of chemical reactions, such as hydrogenations, oxidations, dehydrogenations, etc., conducted in either the liquid or the vapor phase because of their ease of preparation and their great activity at relatively low temperatures. Typical operations wherein the catalysts may be used to particular advantage are the hydrogenation of unsaturated hydrocarbons and unsaturated oxycompounds, and the oxidation of saturated and unsaturated organic compounds.

The following example illustrates a suitable mode of executing the process of the invention. It is to be understood that the invention is not to be regarded as limited to the particular compounds, methods of operation and conditions shown in the example.

*Example I*

To a solution of about 80 gm. of potassium hydroxide in 1500 c. c. of water was added drop by drop, while stirring vigorously, a solution of silver nitrate consisting of about 63 gm. of silver nitrate in 1000 c. c. of water. While the silver nitrate solution was being added, a total of about 6.6 gm. of aluminum metal grit was simultaneously introduced into the stirred mixture intermittently in small proportions.

The liquid was decanted from the resulting precipitate and the precipitate treated with about 1 liter of a 1 N. potassium hydroxide solution for about half an hour at room temperature. The precipitate was then separated by filtration, washed with a 2 N. potassium hydroxide solution until free of aluminum, washed with water until free of hydroxide, and subsequently washed with acetone.

A small quantity of the resulting catalyst product was freed of acetone by passing ethylene over it, and its activity as a catalyst for the oxidation of ethylene to ethylene oxide tested. A mixture consisting of ethylene and air in the volume ratio of 1 to 2 was passed over the heated silver catalyst. Oxidation of the ethylene to ethylene oxide was effected at temperatures as low as 125° C.

While I have described my invention in a detailed manner and provided an example illustrating a suitable mode of executing the same, it is to be understood that modifications may be made and that no limitations other than those imposed by the scope of the appended claims are intended.

I claim as my invention:

1. A process for the production of a highly active silver metal catalyst which comprises reducing a silver compound in aqueous medium by means of nascent hydrogen generated in said aqueous medium by dissolving therein a metal which is above hydrogen in the electromotive series of the elements and is soluble in the aqueous medium, separating the resulting silver metal from the reaction mixture, and drying the silver metal substantially out of contact with air whereby finely divided, substantially pure silver metal is obtained.

2. A process for the production of a highly active silver metal catalyst which comprises reducing a silver compound in an aqueous solution of an alkaline metal hydroxide by means of nascent hydrogen generated in said solution by dissolving therein a metal of the group consisting of aluminum and zinc, separating the resulting silver metal from the reaction mixture, and drying the silver metal substantially out of contact with air whereby finely divided, substantially pure silver metal is obtained.

3. A process for the production of a highly active silver metal catalyst which comprises reducing a silver compound in an aqueous solution of an alkali metal hydroxide by means of nascent hydrogen generated in said solution by dissolving aluminum metal therein, separating the resulting silver metal from the reaction mixture, washing the separated silver substantially free of salts and any of the aluminum metal which did not react, and drying the washed silver substantially out of contact with air whereby finely divided, substantially pure silver metal is obtained.

4. A process for the production of a highly active silver metal catalyst by reduction of a silver compound in aqueous medium in the presence of nascent hydrogen generated in said medium which comprises simultaneously adding an aqueous silver nitrate solution and aluminum metal to an aqueous solution of an alkali metal hydroxide, separating the resulting silver metal from the reaction mixture, washing the separated silver substantially free of salts and any of the aluminum metal which did not react, and drying the washed silver out of contact with air whereby finely divided, substantially pure silver metal is obtained.

5. A process for the production of a highly active silver metal catalyst which comprises reducing a silver compound in an aqueous alkaline medium by means of nascent hydrogen generated in said medium by dissolving therein a metal which is above hydrogen in the electromotive series of the elements and is soluble in the aqueous alkaline medium, separating the resulting silver metal from the reaction mixture, and drying the silver metal substantially out of contact with air whereby finely divided, substantially pure silver metal is obtained.

6. A process for the production of a highly active silver metal catalyst which comprises reducing a silver compound in an aqueous solution of an alkali metal hydroxide by means of nascent hydrogen generated in said solution by dissolving zinc metal therein, separating the resulting silver metal from the reaction mixture, washing the separated silver substantially free of salts and any zinc metal which did not react, and drying the washed silver out of contact with air whereby finely divided, substantially pure silver metal is obtained.

7. A process for the production of a highly active silver metal catalyst which comprises reducing a silver compound in an agitated aqueous solution of an alkali metal hydroxide by means of nascent hydrogen generated in said solution by dissolving finely divided zinc metal therein, separating the resulting silver metal from the reaction mixture, washing the separated silver substantially free of salts and any zinc metal which did not react, and drying the washed silver out of contact with air whereby finely divided, substantially pure silver metal is obtained.

8. A highly active, finely divided, substantially pure silver metal catalyst prepared according to the process of claim 1.

9. A highly active, finely divided, substantially pure silver metal catalyst prepared according to the process of claim 2.

10. A highly active, finely divided, substantially pure silver metal catalyst prepared according to the process of claim 4.

GERARDUS HENDRICUS VISSER.